(12) United States Patent
Codrescu et al.

(10) Patent No.: US 7,849,466 B2
(45) Date of Patent: Dec. 7, 2010

(54) CONTROLLING EXECUTION MODE OF PROGRAM THREADS BY APPLYING A MASK TO A CONTROL REGISTER IN A MULTI-THREADED PROCESSOR

(75) Inventors: Lucian Codrescu, Austin, TX (US); Donald Robert Padgett, Austin, TX (US); Erich Plondke, Austin, TX (US); Taylor Simpson, Austin, TX (US); Muhammad Ahmed, Austin, TX (US); William C. Anderson, Austin, TX (US); Sujat Jamil, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1448 days.

(21) Appl. No.: 11/180,017

(22) Filed: Jul. 12, 2005

(65) Prior Publication Data

US 2007/0016759 A1 Jan. 18, 2007

(51) Int. Cl.
G06F 9/46 (2006.01)
G06F 9/45 (2006.01)
G06F 15/00 (2006.01)

(52) U.S. Cl. .................. 718/106; 718/102; 718/108; 712/223; 712/224; 712/229; 717/139; 717/140

(58) Field of Classification Search ................ 718/106, 718/107; 712/24, 209, 220; 713/324; 326/226
See application file for complete search history.

(56) References Cited

U.S. PATENT DOCUMENTS 6,256,775 B1 * 7/2001 Flynn .................. 717/127

| 6,426,961 | B1 * | 7/2002 | Nimmagadda .............. 370/493 |
| 6,834,336 | B2 | 12/2004 | Takayama et al. |
| 6,928,645 | B2 | 8/2005 | Wang et al. |
| 7,127,588 | B2 | 10/2006 | Mohamed |
| 7,191,349 | B2 | 3/2007 | Kaushik et al. |
| 7,225,446 | B2 | 5/2007 | Whitton |

(Continued)

FOREIGN PATENT DOCUMENTS

EP 1233340 8/2002

(Continued)

OTHER PUBLICATIONS

Ungerer, Theo, A Survey of Processors with Explicit Multithreading; ACM Computing Surveys, vol. 35, Mar. 2003, pp. 29-63.

*Primary Examiner*—Lewis A Bullock, Jr.
*Assistant Examiner*—Jennifer N To
(74) *Attorney, Agent, or Firm*—Nicholas J. Pauley; Peter M. Kamarchik; Jonathan T. Velasco

(57) ABSTRACT

A multithreaded processor device is disclosed and includes a processor that is configured to execute a plurality of executable program threads and a mode control register. The mode control register includes a first data field to control a first execution mode of a first of the plurality of executable program threads and a second data field to control a second execution mode of a second of the plurality of executable program threads. In a particular embodiment, the first execution mode is a run mode and the second execution mode is a low power mode.

31 Claims, 10 Drawing Sheets

U.S. PATENT DOCUMENTS

| | | |
|---|---|---|
| 7,272,700 B1 * | 9/2007 | Pechanek et al. ............. 712/209 |
| 7,290,157 B2 | 10/2007 | De Oliveira Kastrup Pereira et al. |
| 7,451,332 B2 | 11/2008 | Culbert et al. |
| 7,454,631 B1 * | 11/2008 | Laudon et al. .............. 713/300 |
| 7,496,915 B2 | 2/2009 | Armstrong et al. |
| 7,702,045 B2 | 4/2010 | Athanasios |
| 2002/0069345 A1 * | 6/2002 | Mohamed et al. ........... 712/215 |
| 2002/0089348 A1 * | 7/2002 | Langhammer ............... 326/38 |
| 2002/0116436 A1 * | 8/2002 | Whitton ...................... 709/100 |
| 2002/0144083 A1 * | 10/2002 | Wang et al. ................... 712/23 |
| 2002/0144084 A1 * | 10/2002 | Takayama et al. ............. 712/24 |
| 2004/0128563 A1 * | 7/2004 | Kaushik et al. ............. 713/300 |
| 2004/0168039 A1 | 8/2004 | Park |
| 2004/0205719 A1 * | 10/2004 | Hooper et al. ............... 717/124 |
| 2004/0215939 A1 * | 10/2004 | Armstrong et al. .......... 712/220 |
| 2005/0049729 A1 * | 3/2005 | Culbert et al. ................. 700/50 |
| 2005/0229018 A1 * | 10/2005 | De Oliveira Kastrup Pereira et al. .......................... 713/324 |
| 2006/0149921 A1 * | 7/2006 | Lim ............................. 712/10 |

FOREIGN PATENT DOCUMENTS

| | | |
|---|---|---|
| WO | WO03100601 | 4/2003 |

\* cited by examiner

CONTROLLING EXECUTION MODE OF PROGRAM THREADS BY APPLYING A MASK TO A CONTROL REGISTER IN A MULTI-THREADED PROCESSOR

BACKGROUND

I. Field

The present disclosure generally relates to digital signal processors and devices that use such processors. More particularly, the disclosure relates to the execution of multiple program threads by a digital signal processor register.

II. Description of Related Art

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Typically, as these devices become powerful, programmers may want to develop programs that are increasingly complex, e.g., for video decoding. As programs become increasingly complex, it may be necessary to write parallel programs across two or more threads. However, using multiple threads in an active mode can impact the amount of power and overhead required by the microprocessor.

Accordingly it would be advantageous to provide an improved method of controlling multiple program threads within a multi-threaded processor.

SUMMARY

A multithreaded processor device is disclosed and includes a processor that is configured to execute a plurality of executable program threads and a mode control register. The mode control register includes a first data field to control a first execution mode of a first of the plurality of executable program threads and a second data field to control a second execution mode of a second of the plurality of executable program threads. In a particular embodiment, the first execution mode is a run mode and the second execution mode is a low power mode. In another particular embodiment, the low power mode is a wait mode. In still another particular embodiment, during the wait mode state data associated with the second of the plurality of executable program threads is stored in a memory coupled to the processor. In another particular embodiment, the low power mode is an off mode. Further, in a particular embodiment, the processor can be configured to execute up to six different program threads on an interleaved basis.

In a particular embodiment, the multithreaded processor also includes a memory unit and a sequencer that is responsive to the memory unit. The sequencer can support very long instruction word (VLIW) type instructions and at least one of the VLIW instructions uses a number of operands during execution. In another particular embodiment, the multithreaded processor also includes a first instruction execution unit that is responsive to the sequencer, a second instruction execution unit that is responsive to the sequencer, a third instruction execution unit that is responsive to the sequencer, and a fourth instruction execution unit that is responsive to the sequencer. In a particular embodiment, the multithreaded processor also includes a register file including a plurality of registers. In a particular embodiment, the register file can be coupled to the memory unit and coupled to the first instruction execution unit, the second instruction execution unit, the third instruction execution unit, and the fourth instruction execution unit. In another particular embodiment, the register file includes the mode control register.

In another embodiment, a mode control register within a multithreaded processor is disclosed. In this embodiment, the multithreaded processor can include a first data field that can be used to control a first execution mode of a first program thread to be executed by the multithreaded processor. Further, the multithreaded processor can include a second data field to control a second execution mode of a second program thread to be executed by the multithreaded processor.

In yet another embodiment, a module for use in connection with a multithreaded processor is disclosed. In this embodiment, the module can include a first global control register that can be used to control a first function of the multithreaded processor and a second global control register that is a mode control register. In this embodiment, the mode control register includes a first field that can be used to control an execution mode of a first thread of the multithreaded processor and a second field that can be used to control an execution mode of a second thread of the multithreaded processor.

In still another embodiment, a method of controlling multiple threads is disclosed. The method includes receiving a first control signal from a first thread, changing the contents of a control register in response to the first control signal, and placing a second thread into one of at least three selectable modes based on the contents of the control register.

In still yet another embodiment, an operating system is disclosed. The operating system includes a control module to control a plurality of program threads, a thread mode module to receive thread mode requests from at least one of the plurality of program threads, and a thread control register responsive to the thread mode module. In this particular embodiment, the mode of each of the plurality of program threads is based on the contents of the thread control register.

In another embodiment, a digital signal processor is disclosed, and includes a memory, a sequencer that is responsive to the memory, a register file that is coupled to the memory, a multithreaded processor, and a global mode control register. In this particular embodiment the global mode control register includes a first field that can be used to control an execution mode of a first thread of the multithreaded processor and a second field that can be used to control an execution mode of a second thread of the multithreaded processor.

In yet another embodiment, a portable communication device is disclosed and includes a digital signal processor. In particular, the digital signal processor includes a memory and a register file that is coupled to the memory. The register file includes a global mode control register. Further, the global mode control register includes a first field that can be used to control an execution mode of a first thread of the digital signal processor and a second field that can be used to control an execution mode of a second thread of the digital signal processor.

An advantage of one or more embodiments disclosed herein can include placing a thread into a low-power mode while placing another thread in an active mode, in order to conserve power.

Another advantage can include controlling the mode of multiple threads with a global control register.

Yet another advantage can include allowing each thread to control the mode of another thread.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

Figure 1:
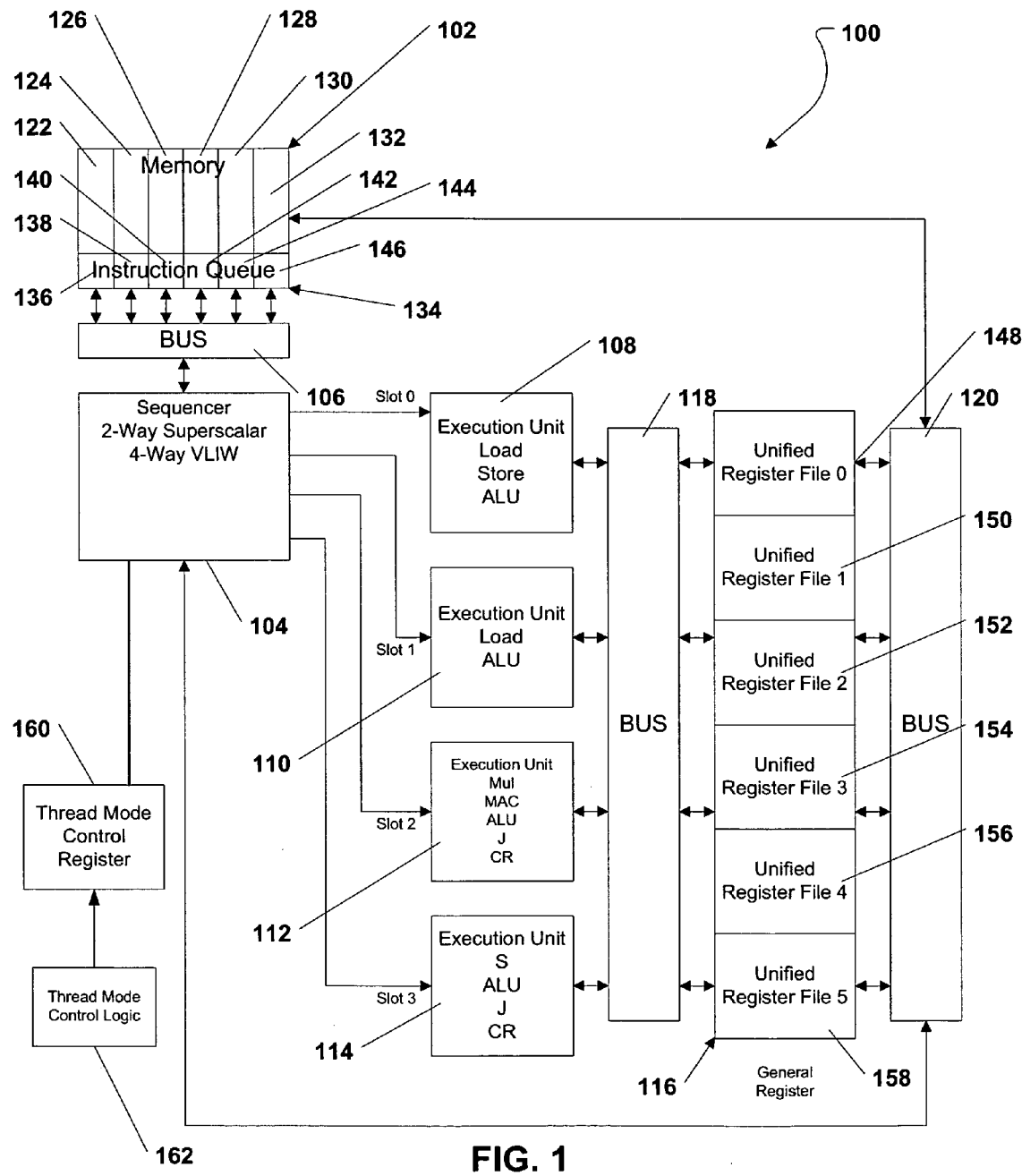
FIG. 1 is a general diagram of an exemplary digital signal processor.

FIG. 1 illustrates a block diagram of an exemplary, non-limiting embodiment of a digital signal processor (DSP) 100. As illustrated in FIG. 1, the DSP 100 includes a memory 102 that is coupled to a sequencer 104 via a bus 106. In a particular embodiment, the bus 106 is a sixty-four (64) bit bus and the sequencer 104 is configured to retrieve instructions from the memory 102 having a length of thirty-two (32) bits. The bus 106 is coupled to a first instruction execution unit 108, a second instruction execution unit 110, a third instruction execution unit 112, and a fourth instruction execution unit 114. FIG. 1 indicates that each instruction execution unit 108, 110, 112, 114 can be coupled to a general register file 116 via a first bus 118. The general register file 116 can also be coupled to the sequencer 104 and the memory 102 via a second bus 120.

In a particular embodiment, the memory 102 is a content addressable memory (CAM) that includes a first instruction cache 122, a second instruction cache 124, a third instruction cache 126, a fourth instruction cache 128, a fifth instruction cache 130, and a sixth instruction cache 132. During operation, the instruction caches 122, 124, 126, 128, 130, 132 can be accessed independently of each other by the sequencer 104. Additionally, in a particular embodiment, each instruction cache 122, 124, 126, 128, 130, 132 includes a plurality of instructions, instruction steering data for each instruction, and instruction pre-decode data for each instruction.

As illustrated in FIG. 1, the memory 102 can include an instruction queue 134 that includes an instruction queue for each instruction cache 122, 124, 126, 128, 130, 132. In particular, the instruction queue 134 includes a first instruction queue 136 that is associated with the first instruction cache 122, a second instruction queue 138 that is associated with the second instruction cache 124, a third instruction queue 140 that is associated with the third instruction cache 126, a fourth instruction queue 142 that is associated with the fourth instruction cache 128, a fifth instruction queue 144 that is associated with the fifth instruction cache 130, and a sixth instruction queue 146 that is associated with the sixth instruction cache 132.

During operation, the sequencer 104 can fetch instructions from each instruction cache 122, 124, 126, 128, 130, 132 via the instruction queue 134. In a particular embodiment, the sequencer 104 fetches instructions from the instruction queues 136, 138, 140, 142, 144, 146 in order from the first instruction queue 136 to the sixth instruction queue 146. After fetching an instruction from the sixth instruction queue 146, the sequencer 104 returns to the first instruction queue 136 and continues fetching instructions from the instruction queues 136, 138, 140, 142, 144, 146 in order.

In a particular embodiment, the sequencer 104 operates in a first mode as a 2-way superscalar sequencer that supports superscalar instructions. Further, in a particular embodiment, the sequencer also operates in a second mode that supports very long instruction words (VLIWs). In particular, the sequencer can operate as a 4-way VLIW sequencer. In a particular embodiment, the first instruction execution unit 108 can execute a load instruction, a store instruction, and an arithmetic logic unit (ALU) instruction. The second instruction execution unit 110 can execute a load instruction and an ALU instruction. Also, the third instruction execution unit can execute a multiply instruction, a multiply-accumulate instruction (MAC), an ALU instruction, a program redirect construct, and a transfer register (CR) instruction. FIG. 1 further indicates that the fourth instruction execution unit 114 can execute a shift (S) instruction, an ALU instruction, a program redirect construct, and a CR instruction. In a particular embodiment, the program redirect construct can be a zero overhead loop, a branch instruction, a jump (J) instruction, etc.

As depicted in FIG. 1, the general register 116 includes a first unified register file 148, a second unified register file 150, a third unified register file 152, a fourth unified register file 154, a fifth unified register file 156, and a sixth unified register file 158. Each unified register file 148, 150, 152, 154, 156, 158 corresponds to an instruction cache 122, 124, 126, 128, 130, 132 within the memory 102. Further, in a particular embodiment, each unified register file 148, 150, 152, 154, 156, 158 has the same construction and includes an equal number of data operands and address operands.

FIG. 1 illustrates that the DSP 100 can further include a thread mode control register 160 that is coupled to the sequencer 104. As shown, the thread mode control register 160 can be a stand-alone register. Alternatively, the thread mode control register may be included in the general register 116. As illustrated, the DSP 100 can also include thread mode control logic 162. In an illustrative embodiment, the thread mode control logic 162 is coupled to the thread mode control register 160.

During operation of the DSP 100, instructions are fetched from the memory 102 by the sequencer 104, sent to designated instruction execution units 108, 110, 112, 114, and executed at the instruction execution units 108, 110, 112, 114. The results at each instruction execution unit 108, 110, 112, 114 can be written to the general register 116, i.e., to one of the unified register files 148, 150, 152, 154, 156, 158.

In a particular embodiment, the DSP 100 is capable of executing multiple program threads. Further, in a particular embodiment, the DSP 100 can be configured to execute up to six different program threads on an interleaved basis. These program threads can operate in a variety of different modes, including a run mode or a low power mode. In a particular embodiment, the low power mode can be a wait mode. During the wait mode, state data associated with the program thread that is placed in the wait mode can be stored in the memory 102. In another particular embodiment, the low power mode can be an off mode. In a particular embodiment, the mode of each thread is based on the contents of the thread mode control register 160.

In an exemplary, non-limiting embodiment, the thread mode control register can be programmed by the thread mode control logic 162. Further, in an exemplary non-limiting embodiment, the thread mode control register can include a plurality of data fields, with each of the data fields controlling an execution mode of a particular thread. The thread mode control logic 162 can change the data fields to change the mode of a particular thread. For example, the thread mode control logic 162 can change a data field from data that is indicative of a run mode to data that is indicative of a low power mode or data that is indicative of a debug mode. In a particular embodiment, the thread mode control logic 162 is responsive to an instruction executed by a program thread to change the mode of operation of another thread. As such, in a particular embodiment, one thread can control the mode of another thread.

Figure 2:
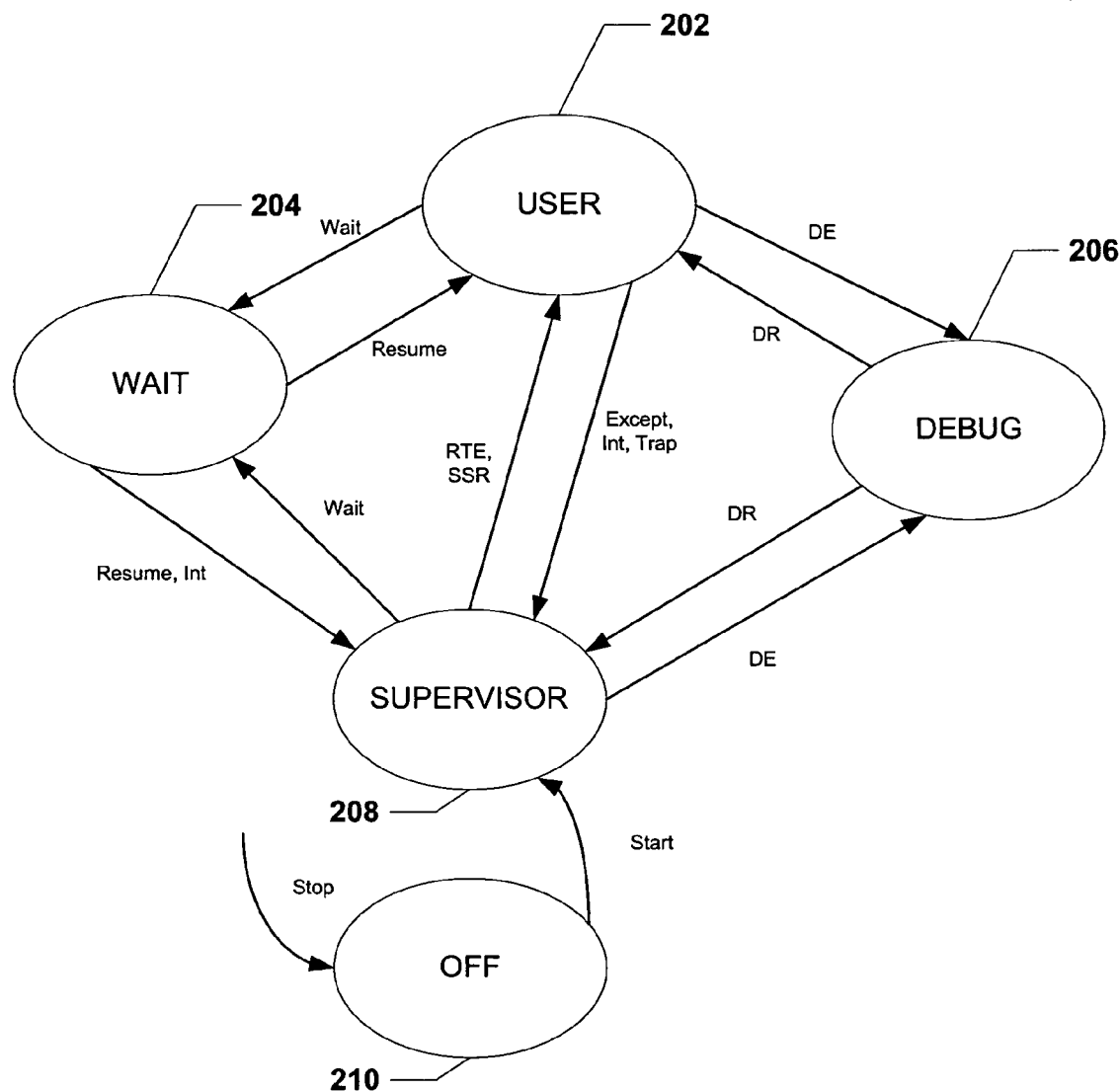
FIG. 2 is a general diagram of an exemplary set of thread modes for a digital signal processor.

Referring to FIG. 2, a state diagram for a multithreaded processor is illustrated. As shown, the states include a user mode 202, a wait mode 204, a debug mode 206, a supervisor mode 208, and an off mode 210. In a particular embodiment, the user mode 202 and the supervisor mode 208 can also be referred to as run modes. Also, in a particular embodiment, an individual thread of a multithreaded processor begins in the off mode 210. Upon receiving a start signal, the thread can enter the supervisor mode 208. From the supervisor mode 208, the thread can enter several different modes. If the thread receives a wait signal, the thread can enter the wait mode 204. In response to an RTE or SSR signal the thread can enter the user mode 202. In a particular embodiment, an RTE signal is an instruction signal. In a particular embodiment, an SSR signal is a signal that changes a status field in a status register. Additionally, in response to a DE signal the thread can enter the debug mode 206. In a particular embodiment, the DE signal is an interrupt signal from a hardware debugger.

If the thread is in the wait mode 204, it can return to the supervisor mode 208 in response to a resume or interrupt signal. In response to a resume signal, the thread may also enter the user mode 202. From the user mode 202, the thread can enter the supervisor mode 208 in response to an exception, interrupt, or trap signal. Also, the thread may also enter the wait mode 204 in response to a wait signal, or the thread can enter the debug mode 206 in response to a DE signal. From the debug mode 206, the thread can enter the user mode 202 or the supervisor mode 208 in response to a DR signal. In a particular embodiment, the DR signal is a release signal from a hardware debugger.

During operation of a multithreaded processor, individual threads can be placed in a variety of different modes in response to control signals. These control signals can be based on a global mode control register. The contents of the global mode control register can be altered by a thread to control other threads.

Figure 3:
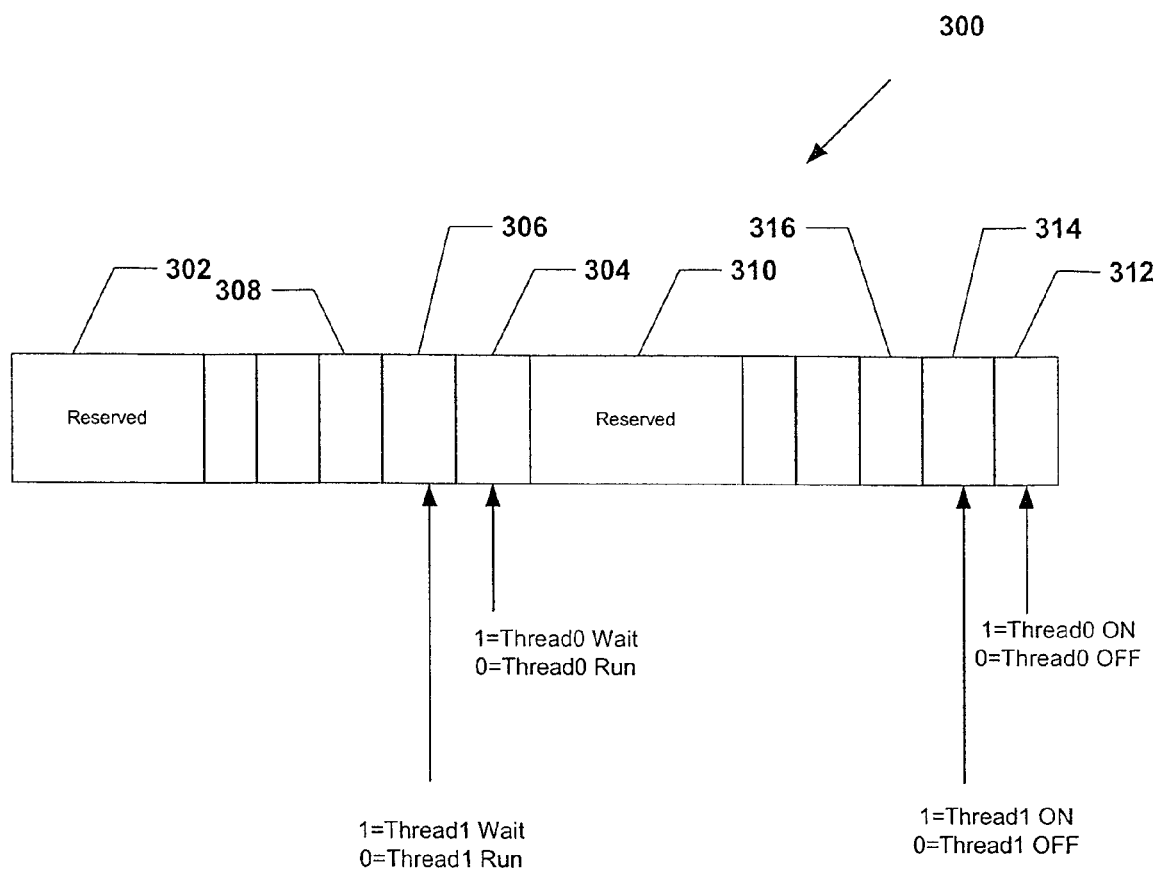
FIG. 3 is a diagram of an exemplary embodiment of a global thread control register.

Referring to FIG. 3, an exemplary embodiment of a mode control register is illustrated. The mode control register includes a variety of data fields, including a first reserved data field 302, a first run mode field 304, a second run mode field 306, a third run mode field 308, a second reserved field 310, a first on/off field 312, a second on/off field 314 and a third on/off field 316. The data fields can store binary values that indicate the operating mode of a particular thread. For example, the first run mode data field 304 can store a binary value that is representative of the execution mode of Thread0. If data field 304 stores a binary value of "1", Thread0 is in a wait mode. Conversely, if the first run mode data field 304 stores a binary value of "0", Thread0 is in a run mode. Similarly, second run mode data field 306 can store a binary value representative of the execution mode of Thread1. As illustrated, on/off data fields 312, 314 store binary values representative of the "on" or "off" modes of Thread0 and Thread1, respectively. Furthermore, reserved data fields 302, 310 can be reserved for other uses, allowing the mode control register 300 to be used for other functions in addition to thread mode control.

Figure 4:
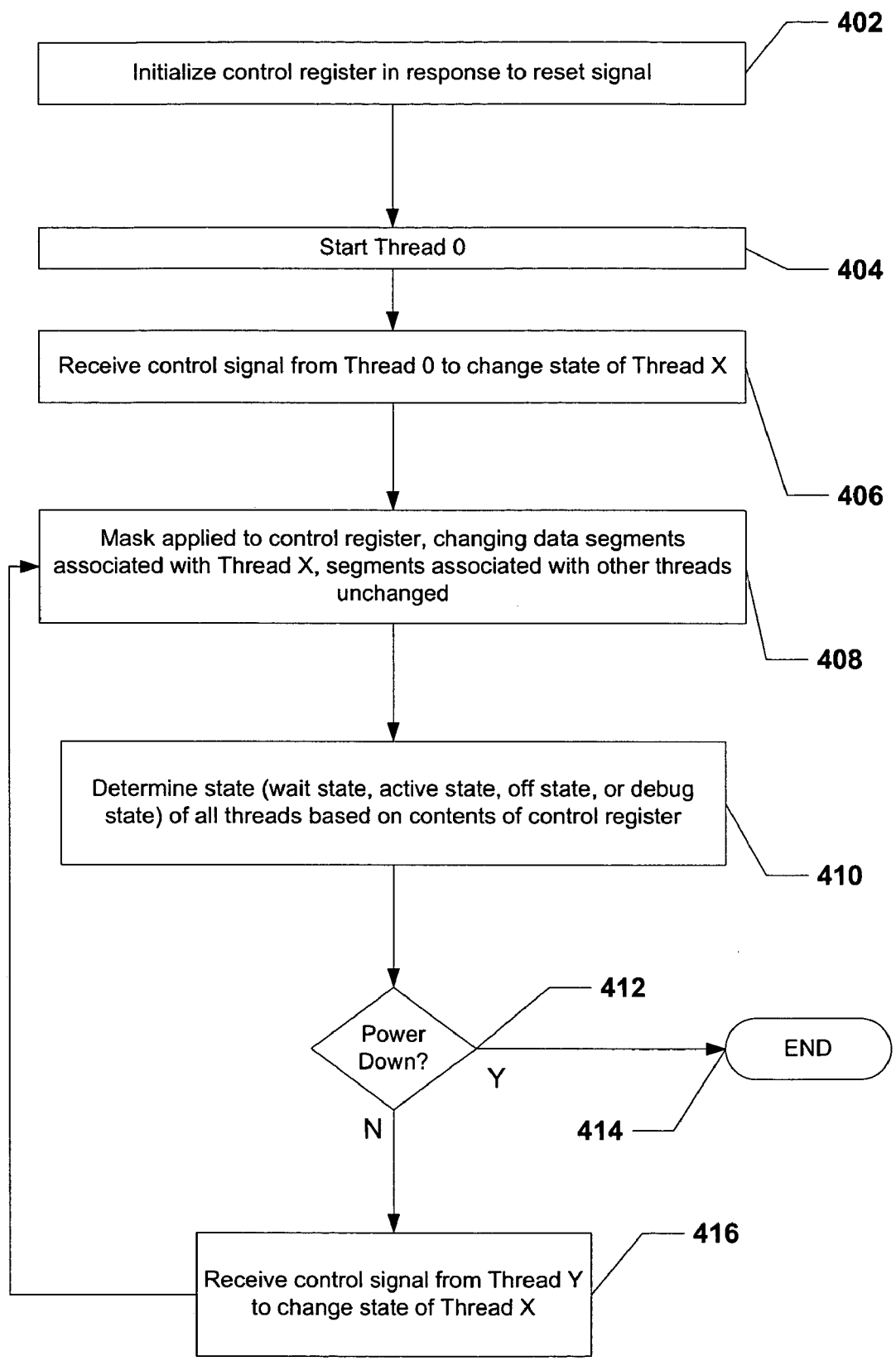
FIG. 4 is a flow diagram of an exemplary method for controlling a global thread control register.

Referring to FIG. 4, a method of controlling the execution mode of a plurality of program threads is illustrated. At step 402, a control register is initialized in response to a reset signal provided by a processor. In a particular embodiment, the control register is a global register. The reset signal may be issued during operation of the processor, or upon startup of the processor, or at another appropriate time. Proceeding to step 404, the processor starts a first thread, labeled "Thread 0." Moving to step 406, a control signal is received by a thread mode control module from Thread 0 to change the mode of a second thread, labeled "Thread X."

At step 408, the thread mode control module applies a mask to the control register to change data segments in the register associated with Thread X. The data segments associated with other threads are left unchanged by the mask. Proceeding to step 410, the processor determines the mode of the processor threads based on the contents of the control register. In this way, Thread X is placed into one of four selectable modes, including a wait mode, an active mode, an off mode, or a debug mode. In a particular embodiment, the control register controls the mode of at least three different threads.

Moving to decision step 412, the processor determines whether it has received a power down signal. If the processor has received the power down signal, the method proceeds to step 414 and ends. If the processor has not received the powered down signal, the method continues at step 416.

At step 416, the processor receives a control signal from a third thread, labeled "Thread Y." The control signal is asserted to change the mode of Thread X. The method then returns to step 408.

Figure 5:
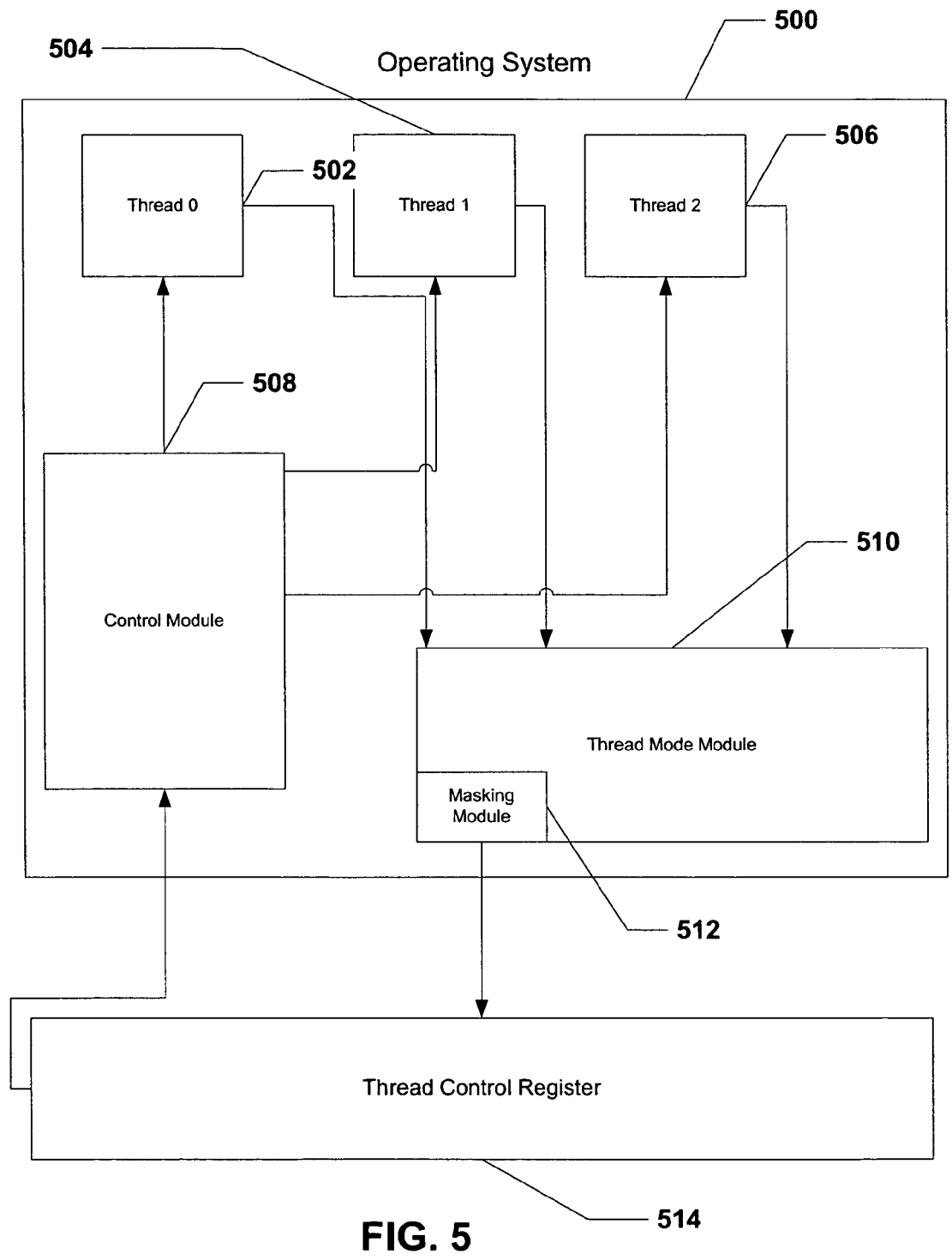
FIG. 5 is a general diagram of an operating system for a digital signal processor.

Referring to FIG. 5, an exemplary embodiment of an operating system 500 to control a multithreaded digital signal processor is illustrated. As shown, the operating system 500 includes a first thread 502 (labeled "Thread0"), a second thread 504 (labeled "Thread1"), and a third thread 506 (labeled "Thread2"). Further, the operating system 500 includes a control module 508 and a thread mode module 510. In a particular embodiment, the thread mode module 510 can include a masking module 512. In another particular embodiment, the operating system 500 can control a thread control register 514. In a particular embodiment, the control module 508 can control operation of the threads 502, 504 and 506. As such, the threads 502, 504, and 506 are coupled to the thread mode module 510. The control module 510 and the thread mode module 510 can control the thread control register 514.

During operation, control module 508 can control the threads 502, 504, and 506. For example, the thread 502 can issue a thread mode request to the thread mode module 510. In response to the request, the thread mode module 510 can use masking module 512 to apply a mask to the thread control register 514. Thereafter, the control module 508 may read the contents of the thread control register 514, and based on the contents of that register, place the threads 502, 504, and 506 in the appropriate state or mode of operation. In this way, the threads 502, 504, and 506 can each control the mode of the other threads. By using the masking module 512 to apply a mask to the thread control register 514, the mode of one of the threads 502, 504 or 506 can be changed while the mode of the other threads are unchanged.

Figure 6:
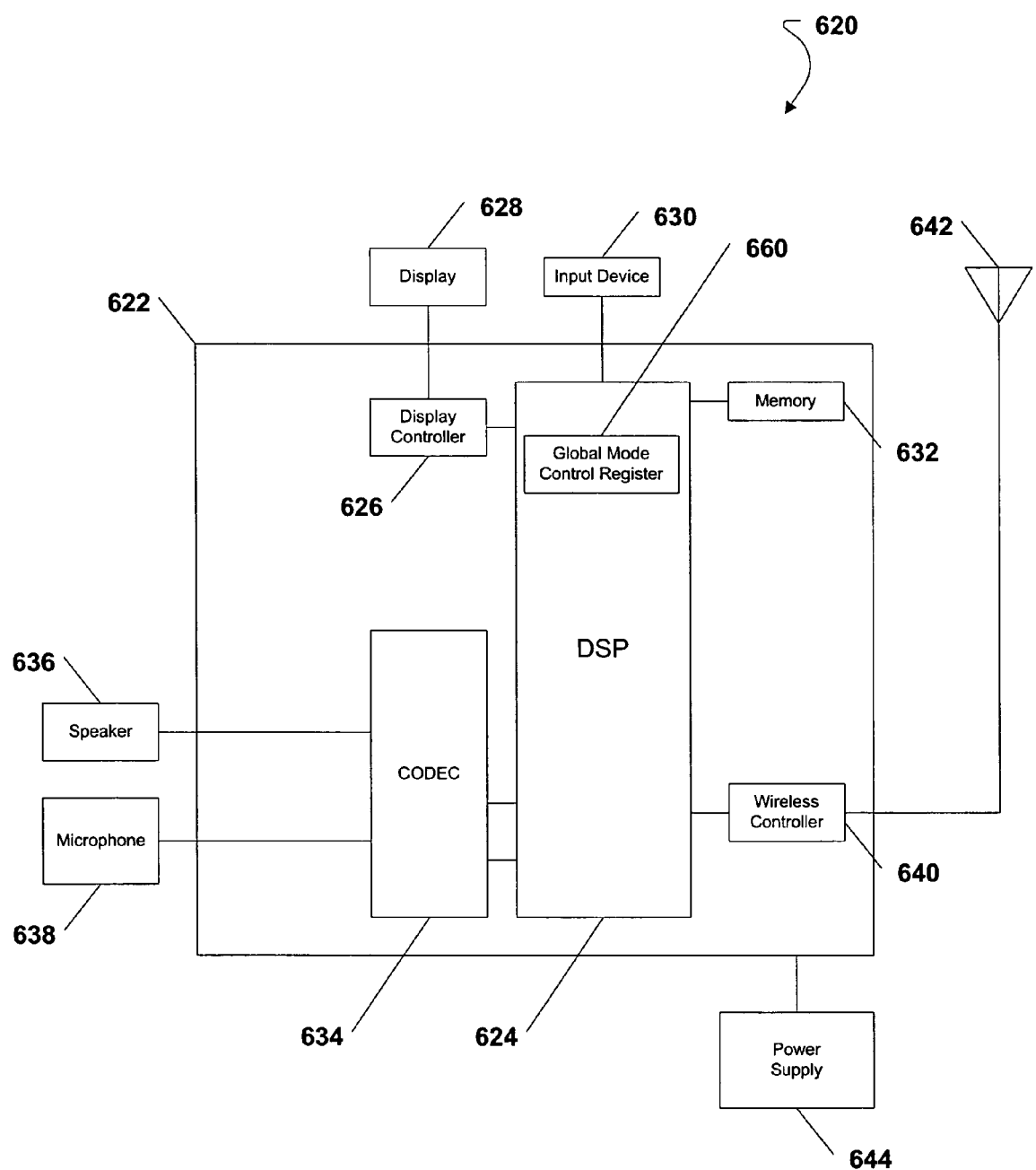
FIG. 6 is a general diagram of a portable communication device incorporating a digital signal processor.

FIG. 6 illustrates an exemplary, non-limiting embodiment of a portable communication device that is generally designated 620. As illustrated in FIG. 6, the portable communication device includes an on-chip system 622 that includes a digital signal processor 624. In a particular embodiment, the digital signal processor 624 is the digital signal processor shown in FIG. 1 and described herein. FIG. 6 also shows a display controller 626 that is coupled to the digital signal processor 624 and a display 628. Moreover, an input device 630 is coupled to the digital signal processor 624. As shown, a memory 632 is coupled to the digital signal processor 624. Additionally, a coder/decoder (CODEC) 634 can be coupled to the digital signal processor 624. A speaker 636 and a microphone 638 can be coupled to the CODEC 630.

FIG. 6 also indicates that a wireless controller 640 can be coupled to the digital signal processor 624 and a wireless antenna 642. In a particular embodiment, a power supply 644 is coupled to the on-chip system 602. Moreover, in a particular embodiment, as illustrated in FIG. 6, the display 626, the input device 630, the speaker 636, the microphone 638, the wireless antenna 642, and the power supply 644 are external to the on-chip system 622. However, each is coupled to a component of the on-chip system 622.

In a particular embodiment, the digital signal processor 624 utilizes interleaved multithreading to process instructions associated with program threads necessary to perform the functionality and operations needed by the various components of the portable communication device 620. For example, when a wireless communication session is established via the wireless antenna 642 a user can speak into the microphone 638. Electronic signals representing the user's voice can be sent to the CODEC 634 to be encoded. The digital signal processor 624 can perform data processing for the CODEC 634 to encode the electronic signals from the microphone. Further, incoming signals received via the wireless antenna 642 can be sent to the CODEC 634 by the wireless controller 640 to be decoded and sent to the speaker 636. The digital signal processor 624 can also perform the data processing for the CODEC 634 when decoding the signal received via the wireless antenna 642.

Further, before, during, or after the wireless communication session, the digital signal processor 624 can process inputs that are received from the input device 630. For example, during the wireless communication session, a user may be using the input device 630 and the display 628 to surf the Internet via a web browser that is embedded within the memory 632 of the portable communication device 620. The digital signal processor 624 can interleave various program threads that are used by the input device 630, the display controller 626, the display 628, the CODEC 634 and the wireless controller 640, as described herein, to efficiently control the operation of the portable communication device 620 and the various components therein. Many of the instructions associated with the various program threads are executed concurrently during one or more clock cycles. As such, the power and energy consumption due to wasted clock cycles may be substantially decreased.

The DSP 624 further includes a global mode control register 660. The global mode control register can be used to control the execution mode of the interleaved threads. The execution mode for each thread can be a wait mode, an active mode, an off mode, a debug mode, or other appropriate mode.

Figure 7:
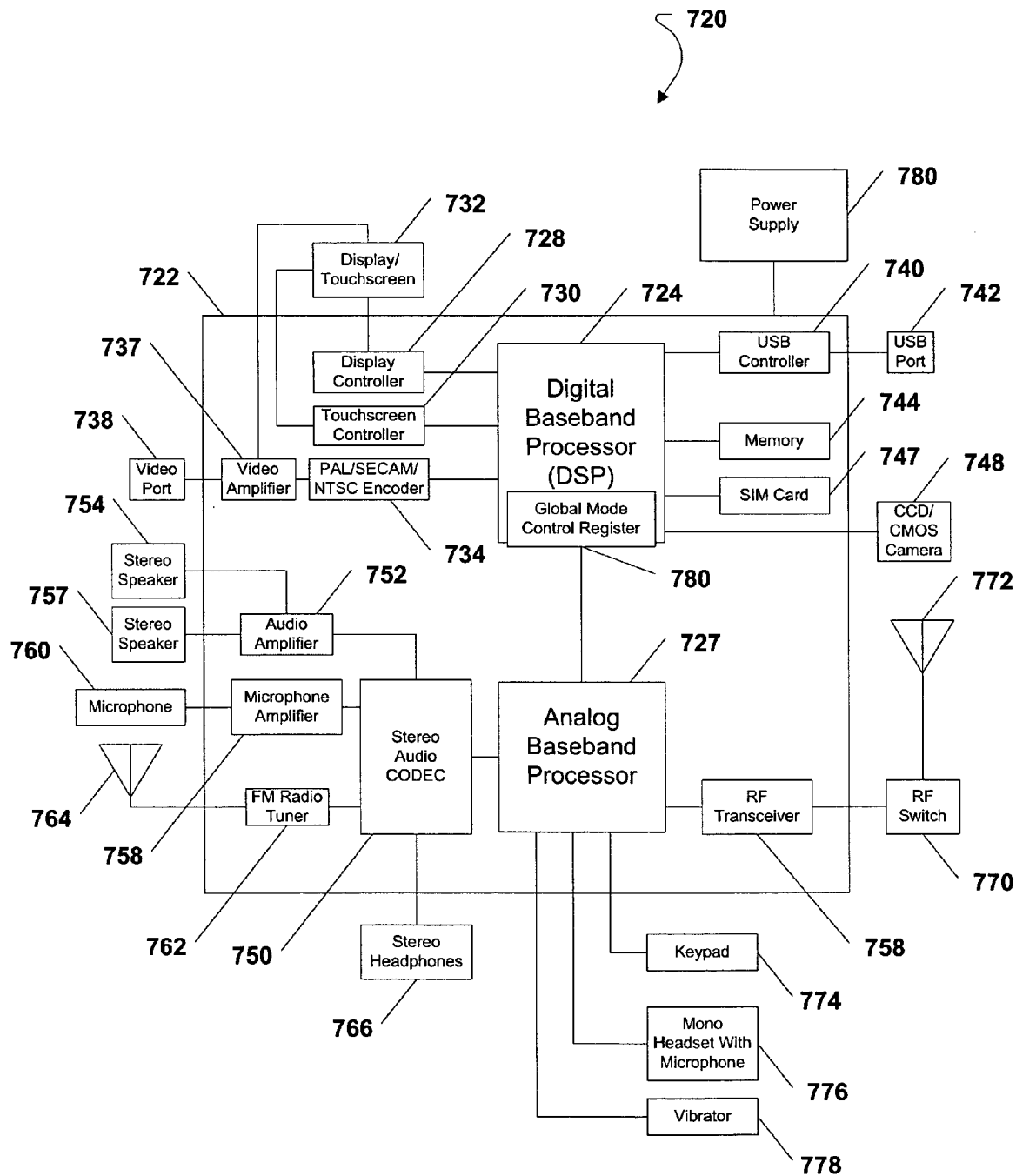
FIG. 7 is a general diagram of an exemplary cellular telephone incorporating a digital signal processor.

Referring to FIG. 7, an exemplary, non-limiting embodiment of a cellular telephone is shown and is generally designated 720. As shown, the cellular telephone 720 includes an on-chip system 722 that includes a digital baseband processor 724 and an analog baseband processor 726 that are coupled together. In a particular embodiment, the digital baseband processor 724 is a digital signal processor, e.g., the digital signal processor shown in FIG. 1 and described herein. The digital signal processor includes a global mode control register 780 to control the execution modes for the threads of the digital signal processor. As illustrated in FIG. 7, a display controller 728 and a touchscreen controller 730 are coupled to the digital baseband processor 724. In turn, a touchscreen display 732 external to the on-chip system 722 is coupled to the display controller 728 and the touchscreen controller 730.

FIG. 7 further indicates that a video encoder 734, e.g., a phase alternating line (PAL) encoder, a sequential couleur a memoire (SECAM) encoder, or a national television system(s) committee (NTSC) encoder, is coupled to the digital baseband processor 724. Further, a video amplifier 736 is coupled to the video encoder 734 and the touchscreen display 732. Also, a video port 738 is coupled to the video amplifier 736. As depicted in FIG. 7, a universal serial bus (USB) controller 740 is coupled to the digital baseband processor 724. Also, a USB port 742 is coupled to the USB controller 740. A memory 744 and a subscriber identity module (SIM) card 746 can also be coupled to the digital baseband processor 724. Further, as shown in FIG. 7, a digital camera 748 can be coupled to the digital baseband processor 724. In an exemplary embodiment, the digital camera 748 is a charge-coupled device (CCD) camera or a complementary metal-oxide semiconductor (CMOS) camera.

As further illustrated in FIG. 7, a stereo audio CODEC 750 can be coupled to the analog baseband processor 726. Moreover, an audio amplifier 752 can coupled to the to the stereo audio CODEC 750. In an exemplary embodiment, a first stereo speaker 754 and a second stereo speaker 756 are coupled to the audio amplifier 752. FIG. 7 shows that a microphone amplifier 758 can be also coupled to the stereo audio CODEC 750. Additionally, a microphone 760 can be coupled to the microphone amplifier 758. In a particular embodiment, a frequency modulation (FM) radio tuner 762 can be coupled to the stereo audio CODEC 750. Also, an FM antenna 764 is coupled to the FM radio tuner 762. Further, stereo headphones 766 can be coupled to the stereo audio CODEC 750.

FIG. 7 further indicates that a radio frequency (RF) transceiver 768 can be coupled to the analog baseband processor 726. An RF switch 770 can be coupled to the RF transceiver 768 and an RF antenna 772. As shown in FIG. 7, a keypad 774 can be coupled to the analog baseband processor 726. Also, a mono headset with a microphone 776 can be coupled to the analog baseband processor 726. Further, a vibrator device 778 can be coupled to the analog baseband processor 726. FIG. 7 also shows that a power supply 780 can be coupled to the on-chip system 722. In a particular embodiment, the power supply 780 is a direct current (DC) power supply that provides power to the various components of the cellular telephone 720 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 7, the touchscreen display 732, the video port 738, the USB port 742, the camera 748, the first stereo speaker 754, the second stereo speaker 756, the microphone, the FM antenna 764, the stereo headphones 766, the RF switch 770, the RF antenna 772, the keypad 774, the mono headset 776, the vibrator 778, and the power supply 780 are external to the on-chip system 722. Moreover, in a particular embodiment, the digital baseband processor 724 can use interleaved multithreading, described herein, in order to process the various program threads associated with one or more of the different components associated with the cellular telephone 720.

Figure 8:
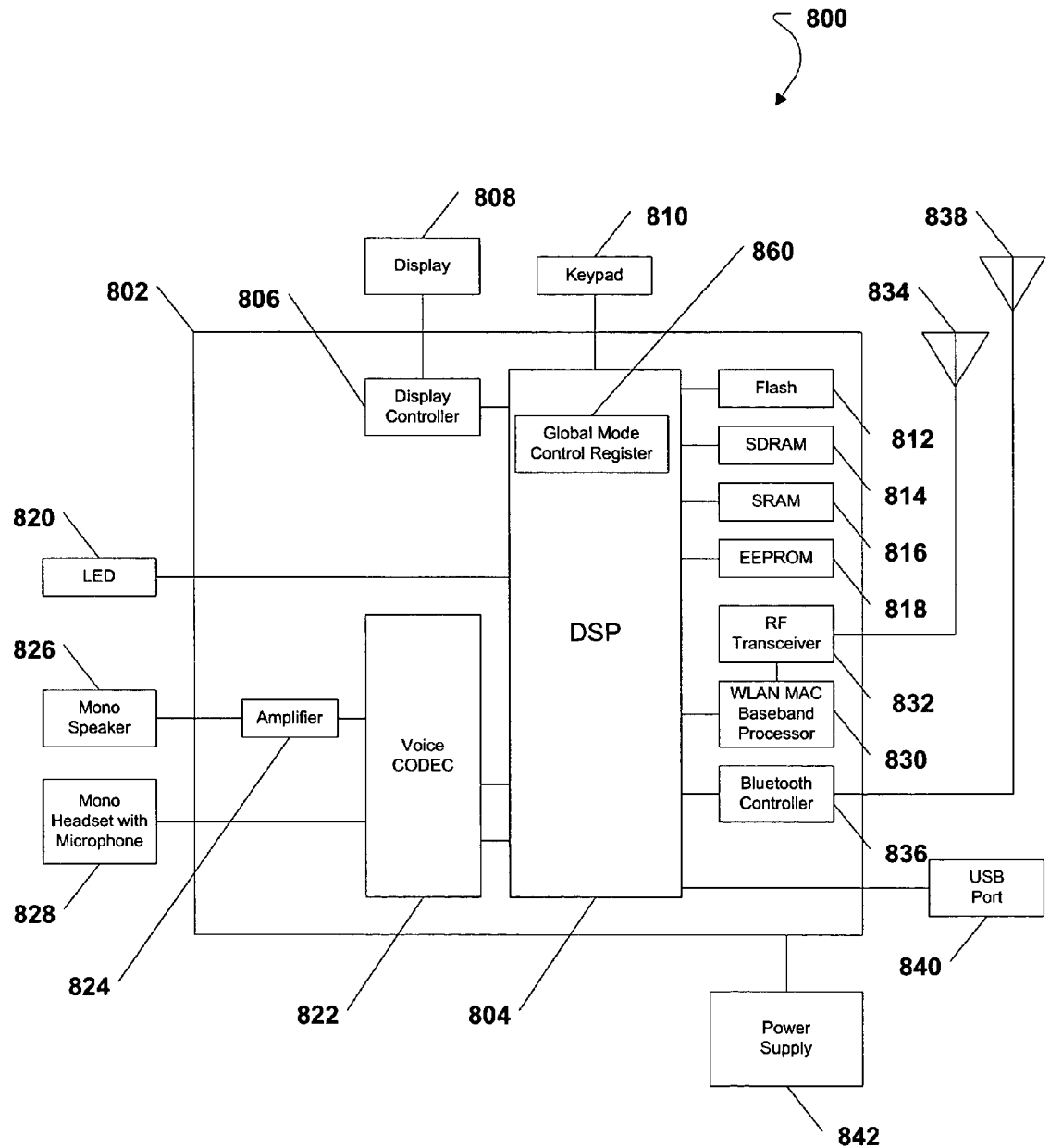
FIG. 8 is a general diagram of an exemplary wireless Internet Protocol telephone incorporating a digital signal processor.

Referring to FIG. 8, an exemplary, non-limiting embodiment of a wireless Internet protocol (IP) telephone is shown and is generally designated 800. As shown, the wireless IP telephone 800 includes an on-chip system 802 that includes a digital signal processor (DSP) 804. In a particular embodiment, the DSP 804 is the digital signal processor shown in FIG. 1 and described herein. The digital signal processor 804 includes a global mode control register 860 to control the program threads of the processor. As illustrated in FIG. 8, a display controller 806 is coupled to the DSP 804 and a display 808 is coupled to the display controller 806. In an exemplary embodiment, the display 808 is a liquid crystal display (LCD). FIG. 8 further shows that a keypad 810 can be coupled to the DSP 804.

As further depicted in FIG. 8, a flash memory 812 can be coupled to the DSP 804. A synchronous dynamic random access memory (SDRAM) 814, a static random access memory (SRAM) 816, and an electrically erasable programmable read only memory (EEPROM) 818 can also be coupled to the DSP 804. FIG. 8 also shows that a light emitting diode (LED) 820 can be coupled to the DSP 804. Additionally, in a particular embodiment, a voice CODEC 822 can be coupled to the DSP 804. An amplifier 824 can be coupled to the voice CODEC 822 and a mono speaker 826 can be coupled to the amplifier 824. FIG. 8 further indicates that a mono headset 828 can also be coupled to the voice CODEC 822. In a particular embodiment, the mono headset 828 includes a microphone.

FIG. 8 also illustrates that a wireless local area network (WLAN) baseband processor 830 can be coupled to the DSP 804. An RF transceiver 832 can be coupled to the WLAN baseband processor 830 and an RF antenna 834 can be coupled to the RF transceiver 832. In a particular embodiment, a Bluetooth controller 836 can also be coupled to the DSP 804 and a Bluetooth antenna 838 can be coupled to the controller 836. FIG. 8 also shows that a USB port 840 can also be coupled to the DSP 804. Moreover, a power supply 842 is coupled to the on-chip system 802 and provides power to the various components of the wireless IP telephone 800 via the on-chip system 802.

In a particular embodiment, as indicated in FIG. 8, the display 808, the keypad 810, the LED 820, the mono speaker 826, the mono headset 828, the RF antenna 834, the Bluetooth antenna 838, the USB port 840, and the power supply 842 are external to the on-chip system 802. However, each of these components is coupled to one or more components of the on-chip system. Further, in a particular embodiment, the digital signal processor 804 can use interleaved multithreading, as described herein, in order to process the various program threads, including execution linked threads associated with two or more of the different components associated with the IP telephone 800.

Figure 9:
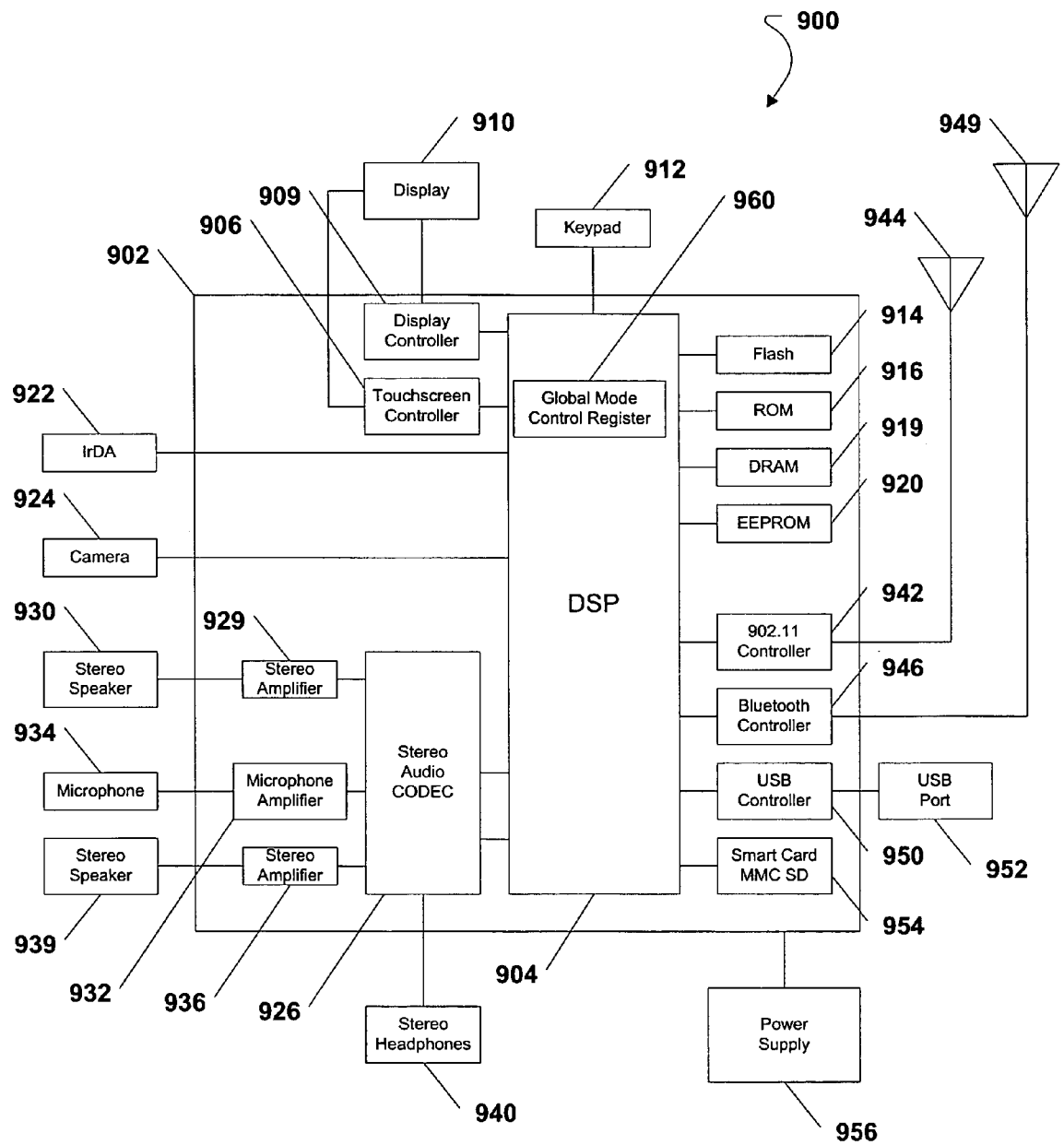
FIG. 9 is a general diagram of an exemplary portable digital assistant incorporating a digital signal processor.

FIG. 9 illustrates an exemplary, non-limiting embodiment of a portable digital assistant (PDA) that is generally designated 900. As shown, the PDA 900 includes an on-chip system 902 that includes a digital signal processor (DSP) 904. In a particular embodiment, the DSP 904 is the digital signal processor shown in FIG. 1 and described herein. The digital signal processor 904 includes a global mode control register 960 to control the program threads of the processor. As depicted in FIG. 9, a touchscreen controller 906 and a display controller 908 are coupled to the DSP 904. Further, a touchscreen display is coupled to the touchscreen controller 906 and to the display controller 908. FIG. 9 also indicates that a keypad 912 can be coupled to the DSP 904.

As further depicted in FIG. 9, a flash memory 914 can be coupled to the DSP 904. Also, a read only memory (ROM) 916, a dynamic random access memory (DRAM) 918, and an electrically erasable programmable read only memory (EEPROM) 920 can be coupled to the DSP 904. FIG. 9 also shows that an infrared data association (IrDA) port 922 can be coupled to the DSP 904. Additionally, in a particular embodiment, a digital camera 924 can be coupled to the DSP 904.

As shown in FIG. 9, in a particular embodiment, a stereo audio CODEC 926 can be coupled to the DSP 904. A first stereo amplifier 928 can be coupled to the stereo audio CODEC 926 and a first stereo speaker 930 can be coupled to the first stereo amplifier 928. Additionally, a microphone amplifier 932 can be coupled to the stereo audio CODEC 926 and a microphone 934 can be coupled to the microphone amplifier 932. FIG. 9 further shows that a second stereo amplifier 936 can be coupled to the stereo audio CODEC 926 and a second stereo speaker 938 can be coupled to the second stereo amplifier 936. In a particular embodiment, stereo headphones 940 can also be coupled to the stereo audio CODEC 926.

FIG. 9 also illustrates that an 802.11 controller 942 can be coupled to the DSP 904 and an 802.11 antenna 944 can be coupled to the 802.11 controller 942. Moreover, a Bluetooth controller 946 can be coupled to the DSP 904 and a Bluetooth antenna 948 can be coupled to the Bluetooth controller 946. As depicted in FIG. 9, a USB controller 950 can be coupled to the DSP 904 and a USB port 952 can be coupled to the USB controller 950. Additionally, a smart card 954, e.g., a multimedia card (MMC) or a secure digital card (SD) can be coupled to the DSP 904. Further, as shown in FIG. 9, a power supply 956 can be coupled to the on-chip system 902 and can provide power to the various components of the PDA 900 via the on-chip system 902.

In a particular embodiment, as indicated in FIG. 9, the display 910, the keypad 912, the IrDA port 922, the digital camera 924, the first stereo speaker 930, the microphone 934, the second stereo speaker 938, the stereo headphones 940, the 802.11 antenna 944, the Bluetooth antenna 948, the USB port 952, and the power supply 950 are external to the on-chip system 902. However, each of these components is coupled to one or more components on the on-chip system. Additionally, in a particular embodiment, the digital signal processor 904 can use interleaved multithreading, described herein, in order to process the various program threads, including execution linked threads associated with two or more of the different components associated with the portable digital assistant 900.

Figure 10:
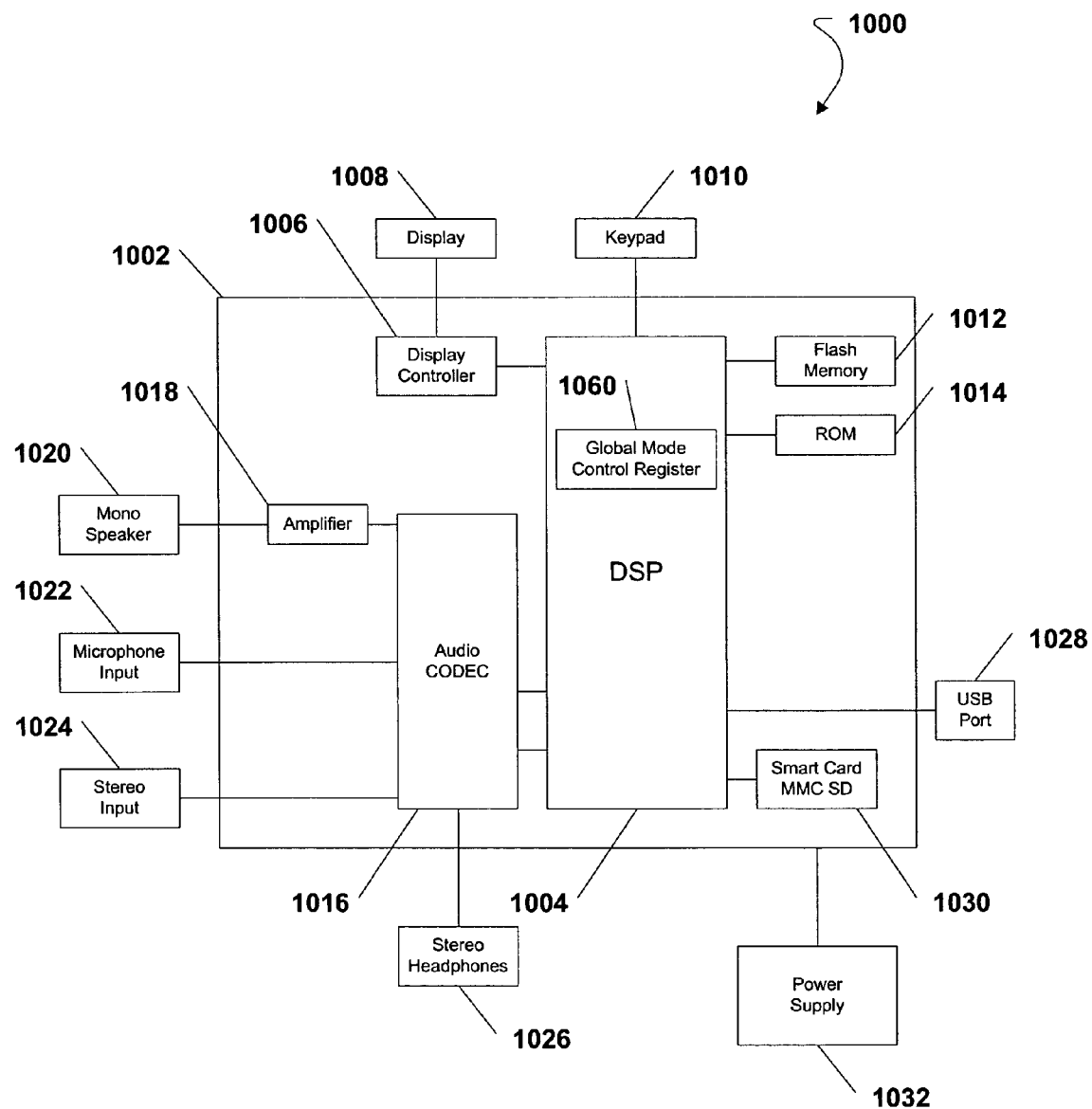
FIG. 10 is a general diagram of an exemplary audio file player incorporating a digital signal processor.

Referring to FIG. 10, an exemplary, non-limiting embodiment of an audio file player, such as moving pictures experts group audio layer-3 (MP3) player is shown and is generally designated 1000. As shown, the audio file player 1000 includes an on-chip system 1002 that includes a digital signal processor (DSP) 1004. In a particular embodiment, the DSP 1004 is the digital signal processor shown in FIG. 1 and described herein. The DSP 1004 includes a global mode control register 1060 to control the program threads of the processor. As illustrated in FIG. 10, a display controller 1006 is coupled to the DSP 1004 and a display 1008 is coupled to the display controller 1006. In an exemplary embodiment, the display 1008 is a liquid crystal display (LCD). FIG. 10 further shows that a keypad 1010 can be coupled to the DSP 1004.

As further depicted in FIG. 10, a flash memory 1012 and a read only memory (ROM) 1014 can be coupled to the DSP 1004. Additionally, in a particular embodiment, an audio CODEC 1016 can be coupled to the DSP 1004. An amplifier 1018 can be coupled to the audio CODEC 1016 and a mono speaker 1020 can be coupled to the amplifier 1018. FIG. 10 further indicates that a microphone input 1022 and a stereo input 1024 can also be coupled to the audio CODEC 1016. In a particular embodiment, stereo headphones 1026 can also be coupled to the audio CODEC 1016.

FIG. 10 also indicates that a USB port 1028 and a smart card 1030 can be coupled to the DSP 1004. Additionally, a power supply 1032 can be coupled to the on-chip system 1002 and can provide power to the various components of the audio file player 1000 via the on-chip system 1002.

In a particular embodiment, as indicated in FIG. 10, the display 1008, the keypad 1010, the mono speaker 1020, the microphone input 1022, the stereo input 1024, the stereo headphones 1026, the USB port 1028, and the power supply 1032 are external to the on-chip system 1002. However, each of these components is coupled to one or more components on the on-chip system. Also, in a particular embodiment, the digital signal processor 1004 can use interleaved multithreading, described herein, in order to process the various program threads, including execution linked threads associated with two or more of the different components associated with the audio file player 1000.

With the configuration of structure disclosed herein, the system and method of controlling multiple threads in a multithreaded processor provides a way to place different program threads into different states. Further, the system and method can allow one thread to determine the state of another thread. The system and method can be used to control any number of program threads in the manner described herein.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A multithreaded processor device comprising:
a processor configured to execute a plurality of executable program threads including a first thread and a second thread;
a mode control register, the mode control register including:
a first data field storing first data, wherein an execution mode of the first thread is a selectable one of a wait mode, a run mode, an off mode, and a debug mode and wherein the execution mode of the first thread is selected according to the first data stored at the first data field; and
a second data field storing second data, wherein the second data is to determine an execution mode of the second thread; and
logic coupled to the mode control register, wherein the logic is configured to modify the first data stored at the first data field by applying a mask to the mode control register.

2. The processor device of claim 1, wherein the run mode is a selectable one of a supervisor mode and a user mode.

3. The processor device of claim 1, wherein the execution mode of the second thread is a selectable one of the wait mode, the run mode, the off mode, and the debug mode.

4. The processor device of claim 3, wherein during the wait mode, state data associated with the second thread is stored in a memory coupled to the processor.

5. The processor device of claim 1, wherein the processor is configured to execute up to six distinct program threads.

6. The processor device of claim 1, further comprising:
a memory unit;
a sequencer to receive instructions from the memory unit;
a first instruction execution unit configured to receive a first instruction from the sequencer;
a second instruction execution unit configured to receive a second instruction from the sequencer;
a third instruction execution unit configured to receive a third instruction from the sequencer;
a fourth instruction execution unit configured to receive a fourth instruction from the sequencer; and
a register file including the mode control register.

7. The processor device of claim 1, wherein the logic is operative to change the first data stored at the first data field to data indicative of the debug mode.

8. The processor device of claim 1, wherein the logic is responsive to an instruction executed by one of the plurality of executable program threads other than the first program thread.

9. A mode control register within a multithreaded processor, the mode control register comprising:
a first data field storing first data, wherein an execution mode of a first program thread of the multithreaded processor is selected according to the first data stored at the first data field and wherein the execution mode of the first program thread is a selectable one of a wait mode, a run mode, an off mode, and a debug mode;
a second data field storing second data, wherein the second data is to determine an execution mode of a second program thread of the multithreaded processor; and
logic coupled to the mode control register, wherein the logic is configured to modify the first data stored at the first data field by applying a mask to the mode control register.

10. The mode control register of claim 9, wherein the run mode is one of a user mode and a supervisor mode.

11. The mode control register of claim 9, wherein the execution mode of the second program thread is a selectable one of the wait mode, the run mode, the off mode, and the debug mode according to the stored second data.

12. A global control register comprising a mode control register, the mode control register comprising:
a first field storing first data, wherein an execution mode of a first thread of a multiprocessor is a selectable one of a wait mode, a run mode, an off mode, and a debug mode and wherein the execution mode of the first thread is selected according the stored first data;
a second field to determine an execution mode of a second thread of the multithreaded processor; and
logic coupled to the mode control register, wherein the logic is configured to modify the first data stored at the first data field by applying a mask to the mode control register.

13. The module of claim 12, wherein the global control register is coupled to a unified register and is updateable in response to at least one execution unit of the multithreaded processor.

14. A method comprising:
receiving a first control signal from a first thread;
changing contents of a control register in response to the first control signal; and
placing a second thread into a selectable one of at least an active mode, a wait mode, an off mode, and a debug mode,
wherein the selection is based on the contents of the control register;
wherein the control register includes a plurality of data fields;
wherein the execution mode of the second thread is selected based on contents of a particular one of the plurality of data fields; and
wherein the contents of the control register are changed by applying a mask to the control register, wherein applying the mask to the control register comprises changing the contents of the particular one of the plurality of data fields without changing contents of another of the plurality of data fields.

15. The method of claim 14, further comprising:
placing a third thread in a selected one of the selectable execution modes based on the contents of the control register.

16. The method of claim 14, wherein an execution mode of a third thread is determined based on contents of another particular one of the plurality of data fields .

17. The method of claim 14, wherein the control register determines the execution mode of at least three different threads.

18. The method of claim 14, further comprising:
receiving a second control signal from a third thread;
updating the contents of the control register in response to receiving the second control signal; and
placing the second thread into one of the at least four selectable modes based on the updated contents of the control register.

19. The method of claim 14, further comprising initializing the contents of the control register in response to receipt of a reset signal.

20. An apparatus comprising:
a multithreaded processor;
a control module to control a plurality of program threads, wherein each of the plurality of program threads is executable by the multithreaded processor;
a thread mode module to receive a thread execution mode request from a first program thread of the plurality of program threads;
a thread control register responsive to the thread mode module, wherein an execution mode of a second program thread of the plurality of program threads is a selectable one of a wait mode, a run mode, an off mode, and a debug mode, wherein a selection of the execution mode of the second program thread is based on contents of the thread control register; and
a masking module to apply a mask to the thread control register, the mask to:
enable a change of contents of a control field, the control field associated with the second program thread of the plurality of program threads; and
leave contents of another control field unchanged, the another control field associated with a third program thread of the plurality of program threads.

21. A digital signal processor comprising:
a multithreaded processor; and
a global mode control register, the global mode control register including:
a first field storing first data to determine an execution mode of a first thread of the multithreaded processor, wherein the execution mode of the first thread is selected to be one of a wait mode, a run mode, an off mode, and a debug mode according to the stored first data;
a second field storing second data to determine an execution mode of a second thread of the multithreaded processor; and
logic coupled to the global mode control register, wherein the logic is configured to modify the first data stored at the first data field by applying a mask to the global mode control register.

22. The digital signal processor of claim 21, wherein the digital signal processor is included in a portable digital assistant device.

23. The digital signal processor of claim 22, wherein the digital signal processor is operationally coupled to a display controller of the portable digital assistant device.

24. The digital signal processor of claim 22, wherein the digital signal processor is operationally coupled to a flash memory of the portable digital assistant device.

25. The digital signal processor of claim 21, wherein the digital signal processor is included in an audio file player.

26. The digital signal processor of claim 25, wherein the digital signal processor is operationally coupled to a universal serial bus (USB) port.

27. The digital signal processor of claim 21, wherein the digital signal processor is included in a cellular phone.

28. The digital signal processor of claim 27, wherein the digital signal processor is operationally coupled to a digital camera.

29. A portable communication device comprising:
a digital signal processor, wherein the digital signal processor comprises:
  a memory;
  a register file coupled to the memory, the register file comprising a global mode control register, wherein the global mode control register includes:
    a first field storing first data to determine an execution mode of a first thread of the digital signal processor, wherein the execution mode of the first thread is a selectable one of an active mode, a wait mode, an off mode and a debug mode and wherein the execution mode of the first thread is determined according to the stored first data; and
    a second field storing second data to determine an execution mode of a second thread of the digital signal processor; and
  logic coupled to the global mode control register, wherein the logic is configured to modify the first data stored at the first data field by applying a mask to the global mode control register.

30. The portable communication device of claim 29, wherein the execution mode of the second thread is selected from the group consisting of an active mode, a wait mode, and an off mode.

31. A processor comprising:
means for processing a plurality of program threads;
means for controlling an execution mode of each of the plurality of program threads, wherein:
  the execution mode of a first thread of the plurality of program threads is a selectable one of a wait mode, a run mode, an off mode, and a debug mode and wherein the execution mode of the first thread is determined according to first data stored at a mode control register; and
  the execution mode of a second thread of the plurality of program threads is a selectable one of the wait mode, the run mode, the off mode, and the debug mode, wherein the execution mode of the second thread is determined according to second data stored at the mode control register; and
means for modifying the first data stored at the first data field by applying a mask to the global mode control register.

* * * * *

UNITED STATES PATENT AND TRADEMARK OFFICE
CERTIFICATE OF CORRECTION

| | | |
|---|---|---|
| PATENT NO. | : 7,849,466 B2 | |
| APPLICATION NO. | : 11/180017 | |
| DATED | : December 7, 2010 | |
| INVENTOR(S) | : Codrescu et al. | |

It is certified that error appears in the above-identified patent and that said Letters Patent is hereby corrected as shown below:

Column 14, line 03, claim 16: "fields ." to read as --fields.--

Signed and Sealed this
Thirtieth Day of August, 2011

David J. Kappos
*Director of the United States Patent and Trademark Office*